(12) United States Patent
Faircloth et al.

(10) Patent No.: US 6,508,357 B1
(45) Date of Patent: Jan. 21, 2003

(54) FOLD PACKAGE WITH PRESSURE-SENSITIVE HANGING TAB

(75) Inventors: Michael Faircloth, Winston-Salem, NC (US); Reid London, Clemmons, NC (US)

(73) Assignee: Sara Lee Corporation, Winston-Salem, NC (US)

(*) Notice: Subject to any disclaimer, the term of this patent is extended or adjusted under 35 U.S.C. 154(b) by 10 days.

(21) Appl. No.: 09/667,992

(22) Filed: Sep. 22, 2000

Related U.S. Application Data

(63) Continuation-in-part of application No. 09/370,653, filed on Aug. 6, 1999, now Pat. No. 6,145,659.

(51) Int. Cl.⁷ .............................. B65D 85/18; B65D 5/46
(52) U.S. Cl. ..................... 206/284; 206/296; 206/299; 206/806; 229/117.24
(58) Field of Search ................................. 206/284, 288, 206/292, 296, 299, 806; 229/117.24, 87.15, 87.16, 87.17, 117.23, 117.22

(56) References Cited

U.S. PATENT DOCUMENTS

| | | | | |
|---|---|---|---|---|
| 1,780,135 A | * | 10/1930 | Lee | 229/87.15 |
| 2,387,329 A | * | 10/1945 | Jacobs | 229/117.24 |
| 3,146,937 A | * | 9/1964 | Vesak | 229/117.24 |
| D258,423 S | * | 3/1981 | Alvarez et al. | 206/299 |
| 4,347,930 A | * | 9/1982 | Herrin | 206/806 |
| 4,590,610 A | * | 5/1986 | Rhyne | 206/806 |
| 6,145,659 A | * | 11/2000 | Faircloth et al. | 206/292 |

* cited by examiner

Primary Examiner—Bryon P. Gehman
(74) Attorney, Agent, or Firm—Kilpatrick Stockton LLP

(57) ABSTRACT

A fold package formed of a shell has closing members connected to the shell. One of the closing members and the shell have a slot cut in a portion between the one closing member and the shell. A pressure-sensitive hanging element adapted to be adhesively attached to the shell is provided. When the hanging element is adhesively attached to the shell and the one of the closing members is folded against the shell, the hanging element extends through the slot to facilitate hanging the package.

5 Claims, 4 Drawing Sheets

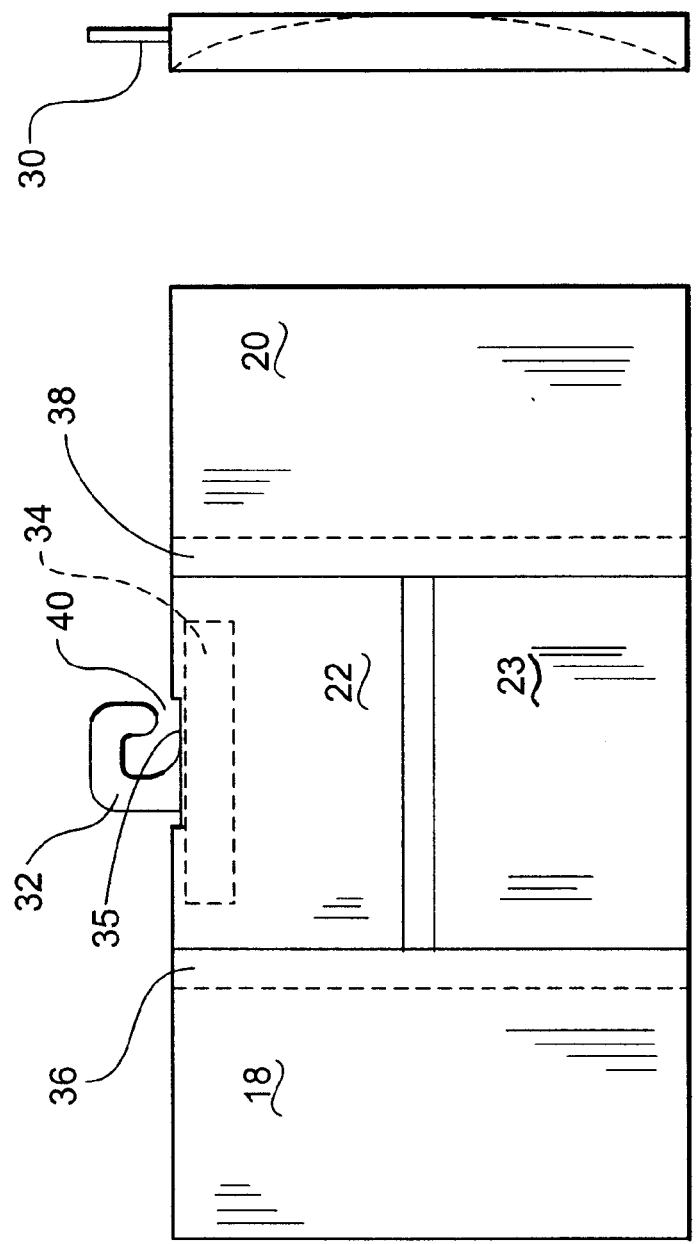
Fig. 4
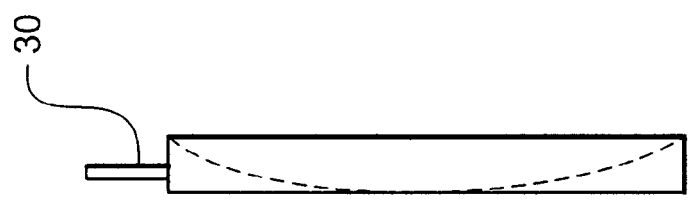
Fig. 5
Fig. 6

FOLD PACKAGE WITH PRESSURE-SENSITIVE HANGING TAB

CROSS REFERENCE TO RELATED APPLICATIONS

This application is a continuation in part of applicants' application having U.S. Ser. No. 09/370,653, filed Aug. 6, 1999, now U.S. Pat. No. 6,145,659.

FIELD OF THE INVENTION

The present invention relates to a folding package and, more particularly, to a substantially flat folding closable package having a pressure-sensitive hanging tab to facilitate hanging the package on a suitable support member.

BACKGROUND OF THE INVENTION

Apparel packaging, particularly with hosiery products, has traditionally been in the form of boxes or flat hosiery package designed to display the garment which is ultimately enclosed in cellophane or a suitable plastic material. Such package is usually displayed within specially designed counters or in free-standing displays.

Other product display procedures involve hanging the garment on a rack or hanger with no enclosure so that the consumer can touch the garment and examine it closely. While this technique is acceptable in a number of circumstances, it is not desirable to leave open a hosiery package so that the consumer touches the actual fabric of the garment. More often, samples of the fabric of the garment are positioned on the display for close consumer examination.

There is a desire and need to display flat packaging in a more observable manner and to remove it from the clutter of the counter that often occurs when consumers constantly pick up and replace packaged garments for close inspection. Hanging flat hosiery packages on a display requires some form of hanging device to be utilized with the package that will engage a support member on the display and maintain the package in the desired location. Hanging tabs that are integral cut-outs or extensions of a cardboard package are often used for this purpose. However, customers often remove flat hosiery packages from a display for closer inspection and rehang the packages onto a support member. Repeated removal and rehanging causes wear on cardboard-type hanging tabs, resulting in damage to the hanging tab and package. Indeed, a single sufficiently rigorous pull of a package from a display support member can tear a cardboard hanging tab from a package. As such, cardboard-type hanging tabs may not provide the strength or flexibility of material or construction to allow repeated removal and replacement on display support members. Thus, there is a perceived need for a hanging hosiery package that provides a stronger, more durable, and more flexible hanging element for repeated removal and hanging on a display support member. There is also a need for a hanging hosiery package having a stronger, more durable, and more flexible hanging element that is inexpensive to manufacture and use. It is to these perceived needs that the present invention is directed.

SUMMARY OF THE INVENTION

The foldable package of the present invention includes a shell having a front panel, first and second side panels foldably connected to the front panel, a bottom panel foldably connected to the front panel, and a top panel foldably connected to the front panel. The front and top panels have a slot cut in a portion between the two panels. The foldable package of the present invention further includes a pressure-sensitive hanging element adapted to be adhesively attached to the package. The hanging element is preferably plastic. When the hanging element is adhesively attached to the front panel and the top panel is folded down against the front panel, the hanging element extends through the slot and above the package to facilitate hanging the package. The first and second side panels each have a secondary fold portion positioned between the front panel and the first and side panels to provide a package thickness dimension. The package is particularly useful in holding for display knitting hosiery products, such as ladies' fine denier fashion hosiery.

An advantage of the present invention is that it provides an apparel package having a pressure-sensitive hanging tab that will permit the package to be suspended from a support member.

Another advantage of the present invention is that it provides a package of the type described wherein the pressure-sensitive hanging tab is sufficiently strong, durable, and flexible to accommodate repeated removal and hanging on a display support member.

Another advantage of the present invention is that it provides a package of the type described having secondary fold portions to provide a package thickness dimension.

Another advantage of the present invention is that it provides a package of the type described that reliably retains a knitted hosiery product positioned within the fold package.

Still another advantage of the present invention is that it provides a package of the type described, including a top panel, that protects contents of the package, such as fine denier hosiery products, from exposure to soiling during display and handling.

Still another advantage of the present invention is that it provides a package of the type described having a stronger, more durable, and more flexible hanging element and that is relatively inexpensive to manufacture and use.

Thus, there has been outlined in summary form the more important features of the invention in order that the detailed description that follows may be better understood and in order that the present contribution to the art may be better appreciated. There are obviously additional features of the invention that will be described hereinafter which will form the subject matter of the claims appended hereto. It is to be understood that the invention is not limited in its application to the details of construction and to the arrangement of the components set forth in the following description or illustrated in the drawings. The invention is capable of other embodiments and of being practiced and carried out in various ways.

It is also to be understood that the phraseology and terminology herein are for the purpose of description and should not be regarded as limiting in any respect. Those skilled in the art will appreciate the concept upon which this disclosure is based and that it may readily be utilized as a basis for designing of the structures, methods, and systems for carrying out the several purposes of the present invention It is also to be understood that the abstract is neither intended to define the invention of the application, which is measured by its claims, nor to limit its scope in any way.

This summary and these objectives of the invention, along with the various features of novelty which characterize the invention, are pointed out with particularity in the claims annexed to and forming a part of this disclosure. For a better understanding of the invention, its operating advantages, and the specific objects obtained by its use, reference should be made to the accompanying drawings and descriptive matter in which like characters of reference designate like parts throughout the several views.

BRIEF DESCRIPTION OF THE DRAWINGS

FIG. 4 is a rear elevational view of the package shown in FIGS. 1 and 2, the top and bottom panels in the folded position and showing the hook portion of a pressure-sensitive hanging element extending through a hanging element slot in an embodiment of the present invention.

FIG. 5 is a side elevational view of the package comprising the present invention in the closed position.

FIG. 6 is a side elevational view of the package comprising the present invention showing the side opposite side shown in FIG. 5 in the closed position.

DETAILED DESCRIPTION

The first and second side panels each have a secondary fold portion positioned between the front panel and the first and side panels to provide a package thickness dimension. The package is particularly useful in holding for display knitting hosiery products, such as ladies' fine denier fashion hosiery.

Figure 1:
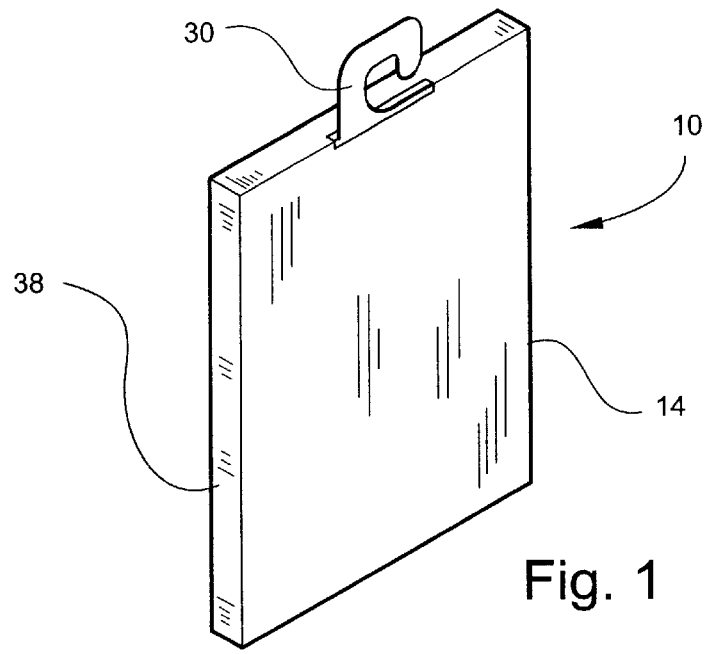
FIG. 1 is a perspective view of the package with pressure-sensitive hanging element comprising the present invention.
Figure 2:
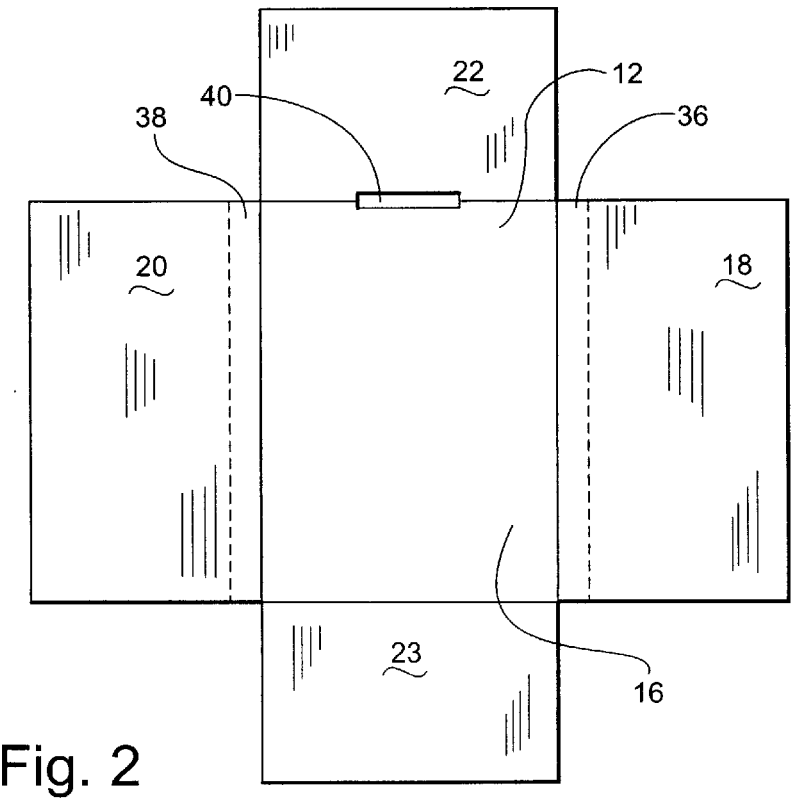
FIG. 2 is a front elevational and display side view of the package comprising the present invention in the packaged opened end position.
Figure 3:
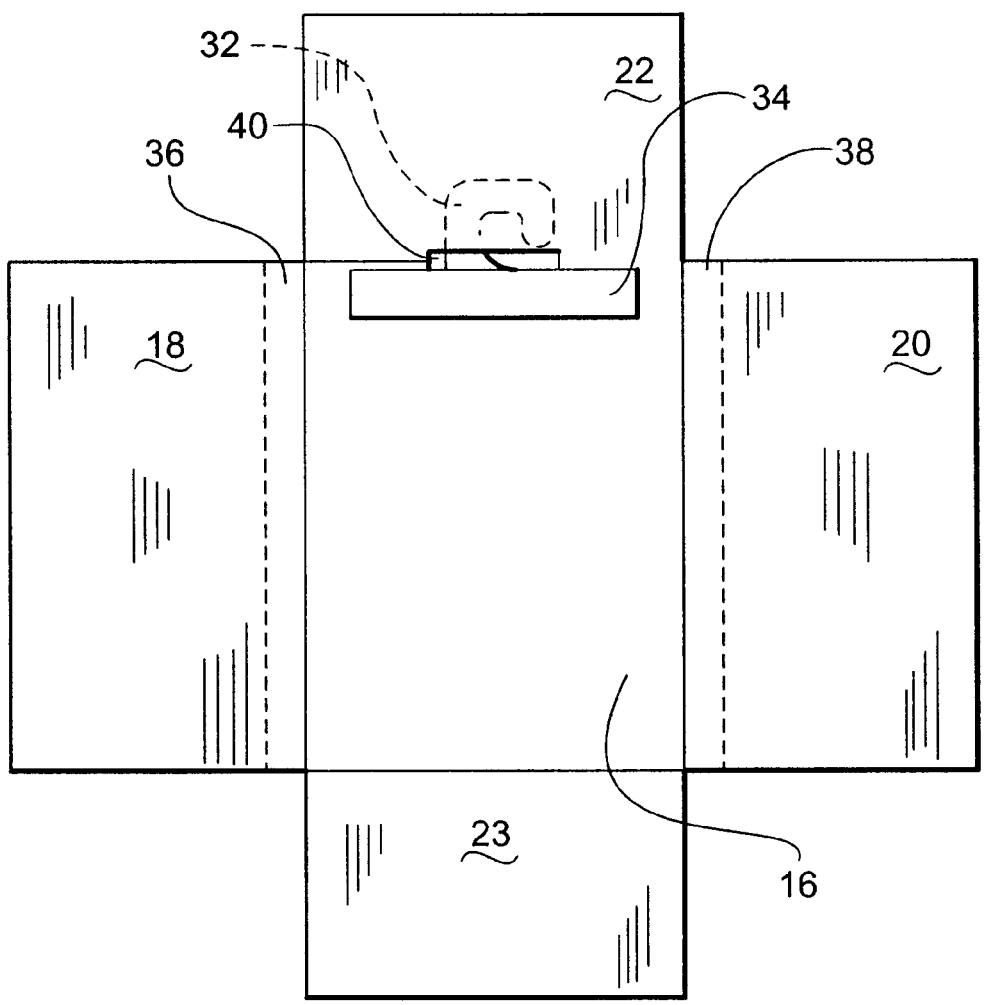
FIG. 3 is a rear elevational view of the package shown in FIGS. 1 and 2, each of the panels in the opened position showing the adhesive portion of the pressure-sensitive hanging element and the secondary fold portions that provide a package thickness dimension in an embodiment of the present invention.
Figure 7:
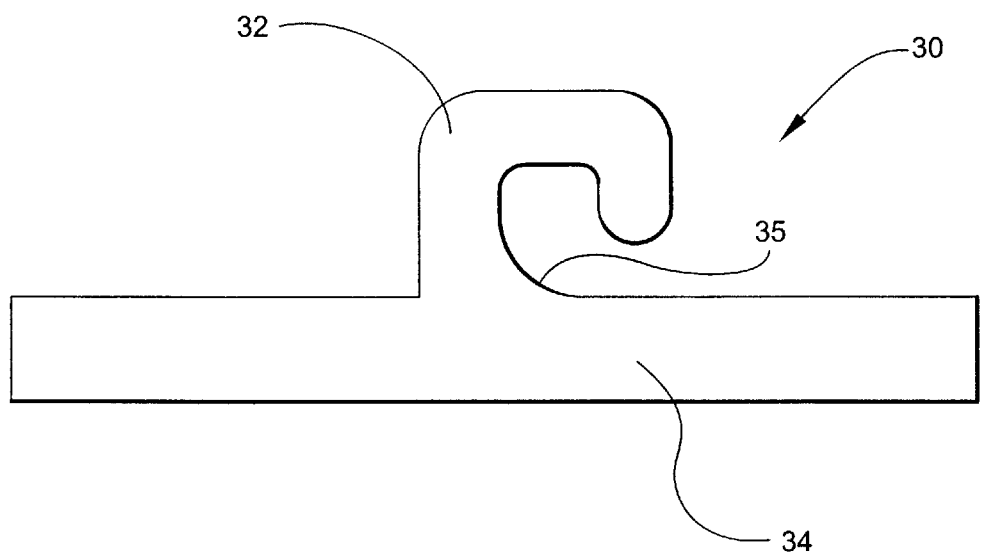
FIG. 7 is a front elevational view of a pressure-sensitive hanging element shown in FIGS. 3–6.

Referring now to the drawings, and particularly to FIG. 1, a foldable package having a pressure-sensitive hanging element is shown generally as 10, which is conveniently arranged to display market indicia on surface 12 (FIG. 2) in an attractive manner. Package 10 includes a shell 14 having a front panel 16, first and second side panels 18, 20 foldably connected to front panel 16, a top panel 22 foldably connected to front panel 16, and a bottom panel 23 foldably connected to front panel 16. A portion of front panel 16 and top panel 22 is cut away at the fold line between these two panels to form a slot 40. Referring to FIG. 7, a pressure-sensitive hanging element 30 having a hook portion 32 and an adhesive portion 34 is adapted to be adhesively attached to the package. As seen in FIGS. 3 and 4, when hanging element 30 is adhesively attached with adhesive portion 34 to front panel 16 and top panel 22 is folded down in closed position against front panel 16, hook portion 32 of hanging element 30 extends through slot 40 and above the package to facilitate hanging the package on a display support member. In a preferred embodiment, pressure-sensitive hanging element 30 is plastic and has sufficient flexibility to accommodate being pulled from a display support member without easily tearing.

First and second side panels 18, 20 each have a secondary fold portion 36, 38 positioned between them and front panel 16 to provide a package thickness dimension when first and second side panels 18, 20 are folded in the manner shown best in FIGS. 5 and 6. Thus, a three-dimensional effect is given the package through the use of a single shell 14, even though top panel 22 and bottom panel 23 simply fold directly downwardly and upwardly and do not have secondary fold portions thus providing a more economical package because of the ability to cut the shell as a single unit.

In an embodiment of the present invention, pressure-sensitive hanging element 30 includes a self-adhesive material on one side of adhesive portion 34. In operation, a packaging machine (not shown) automatically applies pressure to adhesive portion 34 causing the self-adhesive material to attach pressure-sensitive hanging element 30 to package 10. With hanging element 30 adhesively attached to front panel 16, a garment, such as a hosiery product, is placed within package 10. Top panel 22 is folded down in closed position against front panel 16 so that hook portion 32 of hanging element 30 extends through slot 40 and above the package to facilitate hanging the package on a display support member. As hanging element 30 is positioned through slot 40, shoulder 35 of hanging element 30 rests against the fold between front panel 16 and top panel 22, providing further support and strength to the package for repeated removal of the package from and replacement on a display support member.

While not limiting the application of the package of the present invention, a primary and significant use falls within the area of apparel items and, more particularly, in the area of ladies' fine denier fashion hosiery. When used with that product, the knitted hosiery product is positioned within the fold package in the manner described.

The above description presents the best mode contemplated of carrying out the present invention as depicted by the preferred embodiment disclosed. The combination of features illustrated by this embodiment provides its convenience of use and ease of manufacture. This invention is, however, susceptible to modifications and alternate constructions from the embodiment shown in the drawings and described above. Consequently, it is not the intention to limit it to the particular embodiment disclosed. To the contrary, the intention is to cover all modifications and alternative constructions found within the scope of the invention as generally expressed by the following claims.

What is claimed is:

1. A fold package comprising:
 a shell having a front panel, first and second side panels foldably connected to the front panel, a bottom panel foldably connected to the front panel, and a top panel foldably connected to the front panel, the front and top panels having a slot cut in a portion therebetween; and
 a pressure-sensitive hanging element adhesively attached to the front panel in an extended position,
 wherein when the top panel is folded down against the front panel, the hanging element extends through the slot and above the package to facilitate hanging the package.

2. The package as claimed in claim 1, wherein the first and second side panels each have a secondary fold portion positioned between the front panel and the first and second side panels to provide a package thickness dimension.

3. The package as claimed in claim 1, wherein the pressure-sensitive hanging element is plastic.

4. The package as claimed in claim 1, wherein the pressure-sensitive hanging element comprises an adhesive portion.

5. A fold package comprising:
 a shell having a front panel, first and second side panels foldably connected to the front panel, a bottom panel foldably connected to the front panel, and a top panel foldably connected to the front panel, the front and top panels having a slot cut in a portion therebetween;

a pressure-sensitive hanging element adhesively attached to the front panel in an extended position; and a knitted hosiery product positioned within the fold package, wherein when the top panel is folded down against the front panel, the hanging element extends through the slot and above the package to facilitate hanging the package.

* * * * *